United States Patent Office 3,538,052
Patented Nov. 3, 1970

3,538,052
POST-ALKYLATED NOVOLAC RESINS WHEREIN THE ALKYLATING MATERIAL IS A MIXTURE OF ARYLALKENES, ARYLCYCLOALKENES, DICYCLOPENTADIENES AND CYCLOPENTADIENE/ACYCLIC CONJUGATED DIENE CODIMERS
Harold P. Higginbottom, Wilbraham, Mass., assignor to Monsanto Company, St. Louis, Mo., a corporation of Delaware
No Drawing. Filed Mar. 20, 1969, Ser. No. 809,025
Int. Cl. G08g 5/06, 5/18
U.S. Cl. 260—54                    6 Claims

ABSTRACT OF THE DISCLOSURE

Novolac resins produced by first reacting a phenol with an aldehyde and then reacting the product novolac with a specific mixture of arylalkenes, arylcycloalkenes, dicyclopentadienes, and cyclopentadiene/acyclic conjugated diene codimers. The product resins display improved water absorption, electrical and mechanical properties when thermoset.

BACKGROUND

Phenol-aldehyde novolac resins are well known for use in molding, binding, and similar applications. However, such pure phenol aldehyde resins suffer in lack of properties for certain applications. For example, the art has experienced great difficulty in making novolac resins having a combination of good electrical properties, water resistance properties, and mechanical properties. There has been a long felt need in the novolac resin are for modified phenol aldehyde novolac resins which would have such a combination of desirable properties.

Phenol aldehyde novolac resins can be modified by first reacting an aldehyde with a phenol under novolac producing conditions and then thereafter the product novolac can be modified structurally by reacting the novolac with materials which will become functionally substituted in the preformed novolac molecules. The result is that there are produced novolac resins having a high molecular weight in proportion to the total amount of phenol used in the resin manufacture. The ratio of novolac resin prepolymeric molecular weight (that is, the novolac resin molecule weight before curing or thermosetting) to starting phenol content can be termed, for convenience purposes, the novolac PMW efficiency.

In the past, increases in PMW efficiency through the post-alkylation of a preformed novolac have been attemped by using either pure alkylates or mixed alkylates. Examples of pure alkylates include unsaturated hydrocarbon materials (such as styrene and the like), and examples of mixed alkylates including naturally occurring drying oils (such as tung oil or oiticia oil), terpenes and the like. Phenol-aldehyde novolac resins which are post-alkylated with such starting materials as these, however, have a plurality of disadvantages. For one thing, the relative cost of such starting materials is significant thereby making the cost of the resulting alkylated novolac so great that such a material is not competitive with other polymeric materials as respects many use applications. In addition, the resulting phenolaldehyde novolac product when cured can have either an undesirably wide distribution of physical properties (perhaps caused by using an alkylate in which the components vary only slightly or even not at all from one another structurally, or has an undesirably narrow distribution of physical and chemical properties (perhaps caused by using an alkylate in which the components vary from one another structurally). Furthermore, even if the PMW efficiency is improved by using such prior art alkylates, the prior art phenolic product novolac resins derived therefrom commonly tend to be inferior as respects such properties as storage stability, cure rate and, when thermoset, electrical properties, water absoption characteristics, mechanical properties, and the like.

One of the distinct advantages of using post-alkylated novolac resins as opposed to prealkylated novolac resins (that is, resins made by using phenols substituted before polymerization with an alkylate) lies in the fact that the post-alkylated novolac resins as opposed to prealkylated novolac resins is that the molecular weight distribution of the product post-alkylated novolac resin is far more uniform and approaches that of a theoretical normal phenolic molecular weight distribution curve. Such a distribution curve is in marked contrast to the type of distribution curve which is characteristically obtained from a prealkylated novolac resin wherein there is an irregular distribution of molecular weights and even pronounced polymodial distribution of molecular weights. As those skilled in the art will appreciate, polymodial molecular weight distribution in novolac resins are generally undesirable from the standpoint of thermoset product uniformity because such distributions tend to introduce into a given thermoset product poor strength properties and cure characteristics.

There has now been discovered a new class of phenol-aldehyde novolac resins which not only has a high novolac PMW efficiency but also has improved water absorption, electrical, and mechanical properties compared to similar prior art resins. These new resins are produced by first reacting a phenol with an aldehyde and then reacting the product novolac with a specific mixture of arylalkenes, arylcycloalkenes, dicyclopentadienes, and cyclopentadiene/acyclic conjugated diene codimer compounds. Moreover, this new class of post-alkylated phenol-aldehyde novolac resins characteristically has a monomodial uniform molecular weight distribution and has desirable and reasonably fast curing characteristics and optimum strength properties.

SUMMARY

This invention relates to new and very useful substituted phenol-aldehyde novolac resins. In general, these post-alkylated novolacs are made using preformed novolacs as starting materials. Such preformed novolacs are conventionally made, as by first reacting from about 0.4 to 0.95 mol of aldehyde per mol of phenol under acidic catalyzed aqueous phase reaction conditions until a condensation product of aldehyde with phenol having desired characteristics is produced. The methods for making such preformed novolac resins and the preformed novolac resins so produced are well known to those of ordinary skill in the prior art and do not constitute a part of the present invention.

The term "phenol" and the term "aldehyde" each have established meanings of scope in the art of phenolic resins and are used throughout this disclosure and claims in accordance with their generic art established meanings. Thus, the term "phenol" refers to an aromatic six-membered moiety which is substituted with a hydroxyl group. This moiety can be further substituted with other radicals including alkyl radicals, aryl radicals, halo radicals, (including fluorine, chlorine, bromine and iodine), hydroxyl groups and the like as those skilled in the art fully appreciate. A preferred phenol is phenol itself. Similarly, the term "aldehyde" has reference to organic compounds containing the characteristic group:

Examples of suitable aldehydes known to the phenol-aldehyde resin art include aliphatic aldehydes, such as propionaldehyde, acetaldehyde and the like; aromatic aldehydes such as benzaldehyde and the like, cyclic aldehydes such as furfural and the like and mixtures of such. A preferred adehyde is formaldehyde.

A preferred procedure for making a preformed novolac starting resin for use in the present invention involves refluxing aldehyde and phenol in the afore-indicated mol ratios under aqueous phase conditions with an acidic catalytic material such as sulphuric acid, phosphoric acid, oxalic acid, and the like, for a time of from about 20–140 minutes. Then the mixture is dehydrated under vacuum to about 120–160° C. and cooled to produce a solid product.

It will be appreciated that the aldehyde to phenol ratios herein described have reference to the total amount of phenol present before a reaction, including the phenol which is substituted.

Such a preformed novolac resin starting material, in accordance with the teachings of the present invention, is reacted with a controlled mixture of arylalkenes, arylcycloalkenes, dicyclopentadienes, and cyclopentadiene/acyclic conjugaetd diene codimers (herein termed the diene codimer mixture) which comprises (when in a form substantially free of other materials wherein the sum of all component compounds of any given such mixture equals substantially 100 weight percent):

(A) From about 1.5 to 10 weight percent of compounds each molecule of which has:

(1) the indene nucleus
(2) from 9 through 13 carbon atoms
(3) as nuclear substituents from 0 through 4 methyl groups (B) From about 50 to 85 weight percent of compounds each molecule of which has:

(1) the dicyclopentadiene nucleus
(2) from about 10 through 13 carbon atoms
(3) as nuclear substituents from 0 through 3 methyl groups, (C) From about 4 to 10 weight percent of compounds each molecule of which is a codimer of cyclopentadiene with at least one acyclic conjugated alkadiene having from 4 through 6 carbon atoms per molecule, and (D) From about 4 to 30 weight percent of compounds each molecule of which has:

(1) a phenyl group substituted by a vinylidene group,
(2) from 8 through 13 carbon atoms
(3) as substituents from 0 through 3 groups selected from the class consisting of methyl and ethyl.

Examples of suitable such acyclic conjugated alkadienes include butadiene, piperylene, isoprene, 1,3-hexadiene, 1-methyl-1,3-pentadiene, and the like. Examples of suitable such cyclic conjugated alkadienes include cyclopentadiene, methylcyclopentadienes, and the like.

Preferably, those compounds of such a mixture designated as (B) above comprise from about 12 to 25 weight percent of methyldicyclopentadiene and dimethyldicyclopentadiene, the total thereof being the range indicated for (B) above comprise from about 12 to 25 weight percent of methyldicyclopentadiene and dimethyldicyclopentadiene and from about 44 to 64 weight percent of dicyclopentadiene, the total thereof being in the range indicated for (B) above. Preferably, those compounds of such a mixture designated as (A) above are substantially indene. Preferably, those compounds of such a mixture designated as (C) above are substantially codimers of cyclopentadiene with butadiene and isoprene.

At the time when such a diene codimer mixture is reacted with the novolac as indicated, there can be present as diluents inert (e.g., as respects reactivity towards components of such diene codimer mixture and novolac under Friedel-Crafts reaction conditions) organic compounds, such as aromatic and aliphatic hydrocarbons. While there is no apparent upper limit on the amount of diluent which may be present, it is preferred that the amount of diluent present constitutes up to about 50 weight percent (same basis).

By the phrase "when in a form substantially free of other materials" reference is had to a mixture (e.g., of starting materials, of product, or the like, as the case may be) which is substantially free (e.g., on an analytical or theoretical basis) of substances (like inerts as respects reactivity with novolac under Friedel-Crafts catalysis) other than such mixture itself. For example, the afore-indicated starting mixture of diene codimers could have an inert hydrocrabon diluent admixed therewith such as benzene, lower alkyl substituted benzenes, naphthalenes and alkane hydrocarbons containing from 6 through 10 carbon atoms per molecule.

The term "cyclopentadiene" as used herein refers to the cyclic compound having the structure:

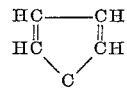

The term "dicyclopentadiene" as used herein refers to the cyclic compound having the structure:

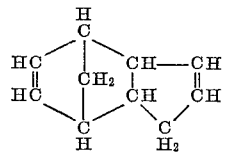

The term "vinylidene" as used herein has generic reference both to vinylidene radicals

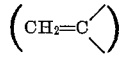

and vinyl radicals (CH₂=CH or CH=CH—). Observe that in diene codimer compound mixtures used in this invention having a phenyl group substituted by a vinylidene group, alpha-methyl substitution is included in this definition, as well as styrene, methyl styrene, and ethyl styrene.

Such a starting material diene codimer compound mixture can be prepared synthetically or derived by suitable preparative procedures from naturally occurring crude petroleum, as those skilled in the art will appreciate. A preferred mixture of such diene codimer compounds for use in this invention is a petroleum derived blend of components having diluents already incorporated thereinto. For example, one suitable such mixture is available commercially under the trade designation "Resin Former P" from the Hess Oil and Chemical Co., which comprises:

TABLE I

| Component | Total weight percent basis [1] | Weight percent diene codimer mixture components only [2] |
|---|---|---|
| Arylcycloalkenes | 1.7 | 1.9 |
| Indene | 1.7 | 1.9 |
| Dicyclopentadienes | 65.5 | 74.1 |
| Dicyclopentadiene | 48.9 | 55.3 |
| Methyldicyclopentadiene | 15.2 | 17.2 |
| Dimethyldicyclopentadiene | 1.4 | 1.6 |
| Cyclopentadiene/alkadiene codimers | 8.0 | 9.1 |
| Codimers of cyclopentadiene with acyclic conjugated alkadienes having from 4 through 6 carbon atoms per molecule: | | |
| Codimer with butadiene | 6.0 | 6.8 |
| Codimer with isoprene | 2.0 | 2.3 |
| Arylalkenes | 6.9 | 7.7 |
| Styrene | 5.6 | 6.3 |
| Alphamethylstyrene | 1.3 | 1.4 |
| Trimers incorporating cyclopentadiene, methylcyclopentadiene or conjugated alkadienes having from 4 through 6 carbon atoms per molecule [3] | 6.4 | 7.2 |
| Diene codimer mixture sub-total | 88.5 | 100.0 |
| Unidentified Components | 3.1 | |
| Inert diluents | 9.4 | |
| Benzene | 0.1 | |
| Toluene | 3.7 | |
| Xylene and ethylbenzene | 5.1 | |
| Naphthalene | 0.5 | |

[1] These values derived using a combination of vapor liquid phase chromatography and mass spectrometry.
[2] When in a form substantially free of other materials wherein the sum of all component compounds of any given such mixture equals substantially 100 weight percent.
[3] Optionally, a diene codimer compound mixture for use in the present invention can contain from about 0 to 8 percent of such trimers.

To react a preformed novolac with such an aforedescribed diene codimer compound mixture, it is convenient to use Friedel-Crafts conditions as indicated.

The term "Friedel-Crafts conditions" as used herein refers to the conventional conditions known to those of ordinary skill in the art used for the alkylating or arylating of hydrocarbons (including phenol) by the catalytic action of aluminum chloride or equivalent catalyst in the presence of appropriate heat and pressure. Conveniently, the preformed novolac and suitable Friedel-Crafts acid catalyst are mixed, brought to the proper temperature and the diene codimer mixture metered into the acidified (or catalyzed) preformed novolac.

For purposes of this invention, the reaction with preformed novolac is preferably carried out at temperatures in the range of from about 25 to 200° C., although higher and lower temperatures can be used. Also, the reaction is preferably conducted under liquid phase conditions at or below atmospheric pressures although superatmospheric pressures can be used. Inert hydrocarbons, as indicated above, generally facilitate the process. Such inert hydrocarbons can be readily removed, such as by vacuum stripping, at the completion of the reaction if desired. Especially when stripping is contemplated, the most preferred inert hydrocarbons have boiling points between about 70 and 140° C. The progress of the reaction can be monitored, if desired, by measuring the quantity remaining of unreacted diene codimer compound using, for example, vapor phase chromatography.

Friedel-Crafts catalysts which may be used in place of aluminum chloride, or together with aluminum chloride, include:

(A) Other inorganic halides, such as gallium, titanium, antimony and zinc halides (including $Zn(Cl_2)$);

(B) Inorganic acids, such as sulphuric, phosphoric and the hydrogen halides (including HF);

(C) Activated clays, such as silica gel and alumina;

(D) $BF_3$ and $BF_3$ organic complexes, such as complexes of $BF_3$ with organic compounds, such as ethanol, butanol, glycol, phenol, cresol, anisole, ethyl ether, isopropyl ether, di-n-butyl ether, formic acid, acetic acid, propionic acid, and the like, with inorganic acids, such as phosphoric acid, sulfuric acid, and the like, and (E) Alkyl, aryl and aralkyl sulfonic acids such as ethane-sulfonic acid, benzene sulfonic acid, benzene disulfonic acid, chlorobenzene sulfonic acid, 3,4-dichlorobenbene sulfonic acid, cresol sulfonic acids, phenol sulfonic acids, toluene sulfonic acids, xylene sulfonic acids, octylphenol sulfonic acid, $\beta$-naphthalene sulfonic acid, 1-naphthol-4-sulfonic acid, and the like.

When $BF_3$ as such is employed, it is conveniently fed to a reaction mixture in gaseous form.

While any combination of diene codimer compound starting mixture, preformed novolac and catalyst can be used, it is particularly convenient to react for each 100 parts by weight of starting preformed novolac about 5 to 100 by weight parts of such diene codimer compound mixture in the presence of less that about 10 weight percent (based on the preformed novolac) of acid catalyst. Preferably from 0.1 to 1.0 weight percent of acid catalyst is used.

The reaction mass is then heated to a temperature in the range of from about 25 to 200° C. The rate of this reaction is dependent, to some degree, on the temperature employed. In general, the reaction is rapid, and a complete reaction between preformed novolac and diene codimer compound mixture is preferred. For the purpose of insuring complete reaction, generally a heating time of from about 10 minutes to 4 hours is employed. The various process variables are summarized in Table II below:

TABLE II

| Process Variable | Broad Range | Preferred Range |
|---|---|---|
| Temperature (° C.) | About 25 to 200° C. | About 100–175° C. |
| Reaction time | Less than about 4 hrs. | About 10 to 30 mins. |
| Catalyst (based on novolac) | Less than about 10 weight percent. | About 0.1 to 1.0 weight percent. |
| Inert hydrocarbon diluent (based on total weight diene codimer compound mixture and diluent). | Up to about 50 weight percent. | About 2–10 weight percent. |
| Total diene codimer compound[1] mixture (based on 100 parts by weight starting preformed novolac). | About 5–100 parts by weight. | [1]About 20 to 80 parts by weight. |

[1] On a 100 weight percent basis when in a form substantially free of other materials.

The properties (e.g., molecular weight distribution, color and the like) of a given so-substituted novolac product are affected by the process conditions used to make that product. The resulting reaction product is as those skilled in the art will appreciate, a complex mixture of various different substituted phenols produced from the reaction of novolac under Friedel-Crafts conditions with diene codimer compound starting mixture to produce novolac molecules which are substituted both on phenyl ring carbon atoms and on phenyl hydroxyl oxygen atoms by moieties derived from such diene codimer compound mixture.

The novolac resins of this invention before use are typically formulated with a curing agent in order to produce a thermosettable composition. Although any conventional novolac curing agent can be used, it is preferred to employ those which are substantially nonvolatile at room temperatures and pressures.

The curing agent employed herein can be hexamethylenetetramine; an epoxy compound containing the group:

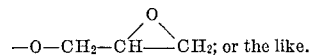

Included among epoxy compounds are polyglycidyl esters of polybasic acids as disclosed in U.S. 2,866,767; polyglycidyl ethers of polyhydric phenols; polyglycidyl ethers of polyhydric alcohols; polyepoxides (including diepoxides); formaldehyde condensates of urea, guanamine, melamine and resorcinol and isocyanates; paraformaldehyde; one-stage phenol-formaldehyde resins (resins wherein more than one mol of formaldehyde is reacted per mol of phenol with an alkaline catalyst); and mixtures of the above. Other suitable curing agents are well known to those of ordinary skill in the art. (See for example, the curing agents described in Novotny, U.S. Pat. 2,156,124.) However, in the preferred practice of this invention, hexamethylenetetramine is employed as the curing agent.

Although liquid curing agents can be used in the practice of this invention, particulate solid curing agents are preferred.

Preferably, when the curing agent is such a solid, it has an average (maximum dimension) particle size of less than about 100 microns. Initially, at the time of admixing, it is preferably, though not necessarily, in a finely divided form (i.e., under about 44 microns in maximum average dimension, and more preferably under about 100 microns).

Mixing of curing agent with novolac can be accomplished by any conventional means, such as by physically intermixing a powdered novolac with the curing agent until a uniform composition is obtained.

To prepare a solution from a solid novolac product of this invention, one can conveniently dissolve the dehydrated liquid novolac resin (described above) in an inert (as respects novolac and curing agent) relatively volatile organic solvent instead of isolating the two-stage lump resin. Suitable inert solvents include alcohols, such as lower alkanols, like ethanol and methanol, ketones such as di(lower alkyl) ketones like methyl ethyl ketone, and hydrocarbons, such as aromatic solvents like xylene, aliphatic solvents like liquid alkanes, such as octane, and mixed alkyl aromatic liquids synthesized from petroleum hydrocarbons.

Preferred solvents are aromatic solvents. The water content of a varnish of this invention can range as high as about 20 weight percent, but preferably is below about 10 weight percent, and more preferably falls in the range of from about 0.5 to 5 weight percent.

These solutions are characteristically dark colored, one-phase, clear liquids having a viscosity ranging from about 100–15,000 centipoises, the viscosity of a given varnish, depending upon chemical process and product variables. For useful applications, viscosities of from about 100 to 5000 centipoises are usual. The total solids content of such a solution can be as high as 85 weight percent or even higher, but typical solids content usually fall in the range of from about 2 to 70 weight percent. As an article of commerce, the solids content of a concentrated solution typically ranges from about 25 to 65 weight percent.

When used for impregnation and reinforcing purposes, the liquid novolac resins of this invention find use in impregnating cellulosic paper, asbestos paper, fabrics, (cotton, glass fibers, nylon, etc.) cork, sand, etc. Impregnation can be accomplished by any convenient means including dipping, coating, spraying, mixing, or the like. The so-impregnated material is dried to lower the volatiles content and then heated to advance the resin to the proper degree for the intended use. In general, the novolac varnishes of this invention are useful in the preparation of paper laminates.

The novel thermosetting novolac resin and curing agent compositions of this invention comprise from about 3 to 25 parts by weight of curing agent per 100 parts by weight of substituted phenol-aldehyde novolac. Preferably, the amount of curing agent present in these compositions ranges from about 10 to 20 parts by weight per 100 parts by weight of novolac resin.

In the practice of this invention, it may be desirable to also incorporate conventional materials with the powdered, solid phenolaldehyde novolac and the curing agent. This includes, for example, such materials as powdered rubber, linseed oil, magnesium silicate, calcium carbonate, talc, clay, finely divided asbestos fibers, waxes including both the natural and synthetic waxes, pigments having tinctorial properties and glass fibers. The amount of these fillers can vary from as low as 1 percent based on the weight of the resin composition to as high as 30 weight percent or higher depending upon the desired end application or use of the resin. They may be first added to the novolac during the preparation thereof or they may be added during the preparation of the composition of novolac and curing agent.

This product is useful as an adhesive and binder for particulate materials, such as sand, cork, wood chips, abrasives, cellulosic fibers, and the like. In general, the novolac resins of this invention in powder form find use in all applications known to the prior art where thermosetting powdered resins are used, including friction elements, molding compounds, granuplasts, and the like.

EMBODIMENTS

The following examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

EXAMPLES 1–5

100 parts of phenol and 0.5 part concentrated sulfuric acid are charged to a suitable reaction vessel and heated to 95° C. Dropwise, there is added 48 parts 50% formalin at such a rate so that the reaction exotherm is controlled and a uniform atmospheric boil is initiated. After addition of formalin is complete, the reaction mixture is heated at atmospheric reflux (100° C.) for 1 hour. Then this intermediate mixture is dehydrated under vacuum to an end point of about 115° C. at 10″ Hg vacuum. To this intermediate resin is added 30 parts of diene codimer compound mixture available commercially as "Resin Former P" from the Hess Oil and Chemical Company (described above) over a period of 30 minutes while keeping the temperature at 115–125° C. The temperature of the mixture is held between 115 and 125° C. after addition of diene codimer compound for 30 minutes. This product mixture is desolvated under vacuum to an end point of about 130° C. at 28″ Hg vacuum. The product is drained from the reaction vessel while hot and fluid and then allowed to solidify.

The foregoing procedure is repeated using different amounts of either the diene codimer compound mixture or the formaldehyde. The results for all examples are summarized in Table III below:

TABLE III
Reactants (parts)

| Ex. | Phenol | 50% formaldehyde | Diene codimer compound mixture | Condensation catalyst (parts) | Alkylation catalyst (parts) |
|---|---|---|---|---|---|
| 1 | 100 | 48 | 30 | $H_2SO_4$ (0.5) | [1] |
| 2 | 100 | 51 | 30 | $H_2SO_4$ (0.5) | [1] |
| 3 | 100 | 38 | 30 | $H_2SO_4$ (0.5) | [1] |
| 4 | 100 | 48 | 50 | $H_2SO_4$ (0.5) | [1] |
| 5 | 100 | 48 | 70 | $H_2SO_4$ (0.5) | [1] |
| 6 | 100 | 51 | 30 | Oxalic acid $H_2O$ (0.8) | $H_2SO_4$ (0.3) |
| 7 | 100 | 51 | 30 | ...do... | Toluene sulfonic acid (0.5) |
| 8 | 100 | 48 | 50 | ...do... | $BF_3$ etherate (0.5) |
| 9 | 100 | 48 | 30 | Toluene sulfonic acid (0.5) | [1] |

[1] The catalyst used for the condensation of phenol and formaldehyde also functions as the alkylation catalyst.

EXAMPLE 6

100 parts of phenol, 51 parts of 50% formalin and 0.8 part of oxalic acid dihydrate are charged to a suitable reaction vessel and heated to an atmospheric boil.

The reaction mixture is heated at atmospheric reflux (100° C.) for 2 hours. After 2 hours of reflux, 0.3 part of 98% H₂SO₄, diluted in water, is added to reaction mixture. Then this intermediate mixture is dehydrated under vacuum to an end point of about 115° C. at 10″ Hg vacuum. To this intermediate resin 30 parts of a diene codimer mixture are added to the phenol mixture over a thirty minute period, keeping the temperature between 125 and 135° C. This diene codimer mixture comprises, when in a form substantially free of other materials wherein the sum of all component compounds of any given such mixture equals substantially 100 weight percent, about 5 percent by weight of indene, about 70 percent by weight of dicyclopentadiene, about 5 percent by weight of codimers of cyclopentadiene with butadiene and isoprene (50/50) and about 20% by weight styrene, (this diene codimer mixture additionally contains about 10 weight percent toluene as an inert diluent) over a period of 30 minutes while keeping the temperature at 115–125° C. The temperature of the mixture is held between 115 and 125° C. after addition of diene codimer compound for 30 minutes. This product mixture is dehydrated under vacuum to an end point of about 130° C. at 28″ Hg vacuum. The product is drained from the reaction vessel while hot and fluid and then allowed to solidify.

EXAMPLE 7

The procedure in Example 6 is repeated except that toluene sulfonic acid (0.5 part by weight) is used in place of sulfuric acid as catalyst, and the diene codimer compound mixture comprises, when in a form substantially free of other materials wherein the sum of all component compounds of any given such mixture equals substantially 100 weight percent, about 10 percent by weight of indene, about 50 percent by weight of dicyclopentadiene, about 10 percent by weight of codimers of cyclopentadiene with butadiene and isoprene (50/50) and about 30 percent by weight styrene. This diene codimer mixture additionally contains about 10 weight percent toluene as an inert diluent.

EXAMPLE 8

100 parts of phenol, 48 parts of 50% formalin and 0.8 part of oxalic acid dihydrate are charged to a suitable reaction vessel and heated to atmospheric boil. The reaction mixture is heated at atmospheric reflux (100° C.) for 2 hours. Then this intermediate mixture is dehydrated under vacuum to an end point of 105° C. at 10″ Hg vacuum. Boron trifluoride etherate (0.5 part) is diluted with an equal portion of toluene and added to reaction. The temperature is adjusted to 115° C. To this intermediate resin is added 30 parts of a diene codimer mixture comprising, when in a form substantially free of other materials wherein the sum of all component compounds of any given such mixture equals substantially 100 weight percent, about 5 percent by weight indene, about 85 percent by weight dicyclopentadiene, about 5 percent by weight of codimers of cyclopentadiene with butadiene and isoprene, (50/50), and about 5 percent by weight of styrene (this diene codimer mixture additionally contains about 10 weight percent toluene as an inert diluent) over a period of 30 minutes while keeping the temperature at 115–125° C. The temperature of the mixture is held between 115 and 125°C. after the addition of diene codimer compound for 30 minutes. This product mixture is desolvated under vacuum to an end point of about 150° C. at 28″ Hg vacuum. The product is drained from the reaction vessel while hot and fluid and then allowed to solidify.

EXAMPLE 9

The procedure of Example 1 is repeated except that toluene sulfonic acid (0.5 part by weight) is used in place of sulfuric acid as catalyst.

EXAMPLE 10

100 parts of a phenol-formaldehyde 2-stage novolac lump resin known as "Resinox 755" available commercially from Monsanto Company is charged to a suitable reaction vessel and heated to 115° C. The resin is fluid at this stage and can be stirred. Toluene sulfonic acid (0.5 part) is added to the molten resin. To this intermediate resin is added 30 parts of diene codimer compound mixture available commercially as "Resin Former P" from the Hess Oil and Chemical Company (described above) over a period of 30 minutes while keeping the temperature at 115–125° C. The temperature of the mixture is held between 115° and 125° C. after addition of diene codimer compound for 30 minutes. This product mixture is desolvated under vacuum to an end point of about 130° C. at 28″ Hg vacuum. The product is drained from the reaction vessel while hot and fluid and then allowed to solidify.

EXAMPLE 11

100 parts of a resorcinol-formaldehyde 2-stage novolac lump resin known as "Penacolite Resin" B–1A available commercially from Koppers Co. is charged to a suitable reaction vessel and heated to 120° C. The resin is fluid at this stage and can be stirred. Toluene sulfonic acid (0.5 part) is added to the molten resin. To this intermediate resin is added 30 parts of diene codimer compound mixture available commercially as "Resin Former P" from the Hess Oil and Chemical Company (described above) over a period of 30 minutes while keeping the temperature at 115–125° C. The temperature of the mixture is held between 115 and 125° C. after addition of diene codimer compound for 30 minutes. This product mixture is desolvated under vacuum to an end point of about 130° C. at 28″ Hg vacuum. The product is drained from the reaction vessel while hot and fluid and then allowed to solidify.

In each of the above numbered examples the solidified reaction product is a post-substituted novolac resin of this invention. These resins are typically broken up for shipping and storage purposes.

What is claimed is:

1. A substituted phenol-aldehyde novolac resin comprising:
   (A) the product produced by reacting a preformed novolac under Friedel-Crafts conditions with from about 5 to 100 parts by weight for each 100 parts by weight of said preformed novolac of a mixture of diene codimer compounds,
   (B) said mixture of diene codimer compounds comprising (when in a form substantially free of other materials wherein the sum of all component compounds of any given such mixture equals substantially 100 weight percent):
      (1) from about 1.5 to 10 weight percent of compounds each molecule of which has:
         (a) the indene nucleus
         (b) from 9 through 13 carbon atoms
         (c) as nuclear substituents from 0 through 4 methyl groups,
      (2) from about 50 to 85 weight percent of compounds each molecule of which has:
         (a) the dicyclopentadiene nucleus
         (b) from about 10 through 13 carbon atoms
         (c) as nuclear substituents from 0 through 3 methyl groups,
      (3) from about 4 to 10 weight percent of compounds each molecule of which is a codimer of cyclopentadiene with at least one acyclic conjugated alkadiene having from 4 through 6 carbon atoms per molecule, and
      (4) from about 4 to 30 weight percent of compounds each molecule of which has:
         (a) a phenyl group substituted by a vinylidene group, (b) from 8 through 13 carbon atoms
(c) as substituents from 0 through 3 groups selected from the class consisting of methyl and ethyl.

2. The product of claim 1 wherein, in said mixture of diene codimers, the portion designated as (C) (2) comprises from about 12 to 25 weight percent of methyldicyclopentadiene and from about 44 to 64 weight percent of dicyclopentadiene.

3. The product of claim 1 wherein, in said mixture of diene codimers, the portion designated as (C) (1) comprises substantially indene.

4. The product of claim 1 wherein, in said mixture of diene codimers, the portion designated as (C) (3) comprises substantially codimers of cyclopentadiene with butadiene and isoprene.

5. The product of claim 1 made by reacting said novolac and said mixture of diene codimer compounds in the presence of an inert hydrocarbon such that, of the combined weight of said mixture of diene codimer compounds and said inert hydrocarbon, the inert hydrocarbon portion constitutes up to about 50 weight percent thereof.

6. In a process for making a substituted phenolic novolac resin the improvement which comprises contacting a preformed novolac under Friedel-Crafts conditions with a mixture of diene codimer compounds, said mixture of diene codimers comprising (when in a form substantially free of other materials wherein the sum of all component compounds of any given such mixture equals substantially 100 weight percent):

(A) from about 1.5 to 10 weight percent of compounds each molecule of which has:
  (1) the indene nucleus
  (2) from 9 through 13 carbon atoms
  (3) as nuclear substituents from 0 through 4 methyl groups
(B) from about 50 to 85 weight percent of compounds each molecule of which has:
  (1) the dicyclopentadiene nucleus
  (2) from about 10 through 13 carbon atoms
  (3) as nuclear substituents from 0 through 3 methyl groups,
(C) from about 4 to 10 weight percent of compounds each molecule of which is a codimer of cyclopentadiene with at least one acyclic conjugated alkadiene having from 4 through 6 carbon atoms per molecule, and
(D) from about 4 to 30 weight percent of compounds each molecule of which has:
  (1) a phenyl group substituted by a vinylidene group,
  (2) from 8 through 13 carbon atoms
  (3) as substituents from 0 through 3 groups selected from the class consisting of methyl and ethyl.

References Cited
UNITED STATES PATENTS

| | | | |
|---|---|---|---|
| 2,163,637 | 6/1939 | Thomas | 260—19 |
| 2,460,724 | 2/1949 | Allen et al. | 260—57 X |
| 2,374,316 | 4/1945 | Whiting | 260—19 |
| 2,809,181 | 10/1957 | Turner et al. | 260—847 |
| 2,897,175 | 7/1959 | Howe et al. | 260—58 X |

FOREIGN PATENTS 585,808   2/1947   Great Britain.

OTHER REFERENCES

Chem Abstracts, vol. 51, 1957, 13466g–i, 13467a–e, Howe et al.

WILLIAM H. SHORT, Primary Examiner

H. SCHAIN, Assistant Examiner

U.S. Cl. X.R.

161—198, 205, 211, 227, 264; 260—3, 19, 29.3, 32.8, 33.4, 33.6, 38, 51, 53, 56, 59, 831, 838, 839, 840